United States Patent [19]
Tran et al.

[11] Patent Number: 5,969,676
[45] Date of Patent: Oct. 19, 1999

[54] RADIO FREQUENCY INTERFEROMETER AND LASER RANGEFINDER/DESTINATION BASE TARGETING SYSTEM

[75] Inventors: My Tran; John E. Rasinski; Paul M. Birmingham, all of Albuquerque, N.Mex.

[73] Assignee: Honeywell Inc., Minneapolis, Minn.

[21] Appl. No.: 08/940,623

[22] Filed: Sep. 30, 1997

[51] Int. Cl.⁶ .............................. G01S 05/04; G01S 07/36
[52] U.S. Cl. ............................ 342/442; 342/13; 342/444
[58] Field of Search .............................. 342/13, 442, 444, 342/54

[56] References Cited

U.S. PATENT DOCUMENTS

| | | | |
|---|---|---|---|
| 3,943,514 | 3/1976 | Afendykiw et al. | 343/15 R |
| 4,393,382 | 7/1983 | Jones | 343/112 D |
| 4,509,052 | 4/1985 | Cash | 343/418 |
| 4,642,649 | 2/1987 | Lightfoot | 342/458 |
| 4,734,702 | 3/1988 | Kaplan . | |
| 5,122,801 | 6/1992 | Hughes | 342/13 |
| 5,123,327 | 6/1992 | Alston et al. | 89/1.813 |
| 5,347,910 | 9/1994 | Avila et al. | 89/41.22 |
| 5,359,920 | 11/1994 | Muirhead et al. . | |
| 5,457,466 | 10/1995 | Rose | 342/442 |
| 5,526,001 | 6/1996 | Rose et al. . | |
| 5,652,588 | 7/1997 | Miron | 342/58 |

FOREIGN PATENT DOCUMENTS

| | | |
|---|---|---|
| 0603003A1 | 6/1994 | European Pat. Off. . |
| 2064257 | 6/1981 | United Kingdom . |

OTHER PUBLICATIONS

Glickstein, IRA et al., AI/Expert System Processing of Sensor Information, Zie Voor Titel Boek, de 2e Pagina, Oct. 13, 1986, pp. 382–388, IBM Federal Systems Division, Owego, NY.

*Primary Examiner*—Mark Hellner
*Attorney, Agent, or Firm*—Andrew A. Abeyta; Kenneth J. Johnson

[57] ABSTRACT

A dual radio frequency interferometer aided by laser rangefinder and terrain database system utilizes two linear rays of RFI sensors to determine the position of a source of RF energy. The dual RFI system is very attractive in that it is a passive system and cannot be detected by other sensors or systems while it is going through its position determination operation. Furthermore, use of two linear arrays of sensors allows for the elimination of chronic effects inherent in radio frequency interferometers. The two linear arrays can be placed anywhere on a vehicle as long as they are in the same common geometric plane and in-flight mechanisms are provided to transform the coordinate systems from the in-flight platform coordinates to the local geodetic coordinates. This provides positioning and source identification which can be beneficial to not only the present system but other systems in the area. With the two linear arrays, a line-of-sight vector can be determined and other systems can be provided with this information in order to provide further details of the source position. Once a pointing vector has been determined, this information can be used with other active systems in order to provide a precise range and location of the source of the RF signals.

26 Claims, 13 Drawing Sheets

Process Passive Target Locate Data

Correlate RFI Target Data

Laser Ranging Aiding Target Locate Mode

RADIO FREQUENCY INTERFEROMETER AND LASER RANGEFINDER/DESTINATION BASE TARGETING SYSTEM

BACKGROUND OF THE INVENTION

In an aircraft, and especially a military aircraft, it is often beneficial to determine the location of radio frequency (RF) signal sources associated with active radar weapons systems because these signal sources are a direct threat to accomplishing a mission and aircraft survival. The most common example of such an RF signal source is a radar installation; however, other RF signal sources may be applicable, including targeting systems.

A device that is beneficial in the targeting and identification of threats or objects in the vicinity of the aircraft is the laser range finder (LRF). This device can determine the range to a target by lazing a laser signal at the target, and deciphering a return signal. Based on the characteristics of the return signal, the exact distance to the target can be determined. The disadvantage of the LRF is its necessity to transmit a signal in order to determine useful information such as line-of-sight range to the target. Again, because a signal is transmitted, other devices or aircraft in the area can detect the presence of the LRF by picking up its transmitted signal. In many applications this is an undesired occurrence.

In order to passively detect a radio frequency signal source, a single axis radio frequency interferometer has been used. This interferometer receives RF signals on a linear array of sensors, and subsequently, calculates an angular relationship between the array sensors and the source of RF energy. More specifically, the array of sensors are arranged in a linear fashion and are sensitive to radio frequency signals. The detected signals are then compared to one another, and phase differences in the detected signals can be suggestive of the angle of arrival of the detected RF signal. The single axis RFI is generally attached to an airframe in a known manner, thus allowing angle of arrival determination for the RF signal as it relates to the airframe coordinates.

The single axis RFI has a number of undesirable characteristics inherent in its design. Most importantly, the single axis RFI is limited to a single axis of operation; therefore, the angle of arrival merely defines a plane in which the RF signal source could exist. While this information is of some benefit to a pilot, it still requires further normal processing and further searching for such RF signal sources. As the operation of an aircraft keeps the pilot very busy, especially in a hostile environment, it is undesirable to require the pilot to do more work than is necessary. Consequently, this extensive searching and interaction by the pilot is undesirable.

Another problem inherent in the single axis system is the occurrence of a phenomenon known as the "conic effect." The conic effect detrimentally effects the accuracy of a single axis RFI when the RF signal source is above or below the plane normal to the axis of the array of sensors. When the RF signal source is above or below the plane normal to the array, the RFI sensors detect the RF source as being at an angle closer to perpendicular than is actually the case. This conic effect causes distortions and inaccuracies in the detected angle of arrival of the RF signal. Consequently, the use of the single axis RFI to determine the position of an RF signal source is not necessarily accurate, nor reliable, and many times requires further interaction by the pilot to estimate for correction factor.

Another method by which the single axis RFI system can be used to generate course position and range of an RF signal source is through the use of triangulation. By accumulating two or more "angles" associated with known headings and positions of an aircraft, triangulation can be used to calculate the position of the RF signal source. This method of RF signal source calculation is a very slow and involved process. It is necessary to accumulate two or more data points, which requires a fair amount of time. Furthermore, very involved and time consuming numerical calculations are required to determine the RF signal source position. Lastly, since the single axis RFI suffers from the conic effect, this will detrimentally effect the accuracy of the triangulation process. Consequently, the use of this triangulation process to determine the actual position of a source of RF energy is slow, inaccurate and non-reliable.

The use of single axis RFI, or other locating systems, provides limited amounts of information. In many situations it would be more helpful if the pilot were to know the actual location and geographic characteristics of the RF signal source. While the pilot may be able to visually locate and estimate position of the RF source, such RF signal sources may be located behind a geographic obstacle, such as a mountain. The pilot, not knowing the existence of this mountain or geographic obstacle, will have inaccurate information regarding the actual position of the RF signal source.

Lastly, since the information received by the single axis RFI system is somewhat limited, this information is of little use for other platforms operating in conjunction with the platform utilizing the single axis RFI.

SUMMARY OF THE INVENTION

Described herein is an apparatus for detecting and locating sources of radio frequency (RF) signals from a moving vehicle. The apparatus has the capability to operate in an entirely passive manner or a semi-active mode which incorporate active sensors such as laser rangefinders.

The RF source detection apparatus of the present invention provides for passively detecting and accurately determining the position of a RF source while the aircraft is in flight. The apparatus of the invention also determines an approximate range to the RF source. Initially, the radio frequency emissions from the source are received using two linear radio frequency interferometer (RFI) arrays disposed in a common geometric plane. Each linear RFI array produces a signal indicative of the angle of arrival of the RF signal with respect to that particular array. The RF source detection apparatus utilizes the signals from the linear RFI arrays to generate an output signals representative of the position, in terms of latitude, longitude and range (horizontal) to the RF source.

The present invention can also make line of sight range determinations by utilizing a digital terrain elevation database (DTED) using the previously calculated RF source position. Coordination of the DTED with the dual RFI sensors of the present invention allows more exact and precise RF source identification. RF source location can be precisely determined in a specific spheroid navigation datum, thus allowing the use of this information by numerous other systems. The DTED contains detailed information regarding the terrain over which the aircraft is flying, thus its combination with the line-of-sight vector allows the determination of the RF source location relative to local geographic configuration. This information can be communicated to other platforms and coordinated with other systems on board the aircraft.

In one embodiment of the invention, the passive targeting system described above is used with a laser rangefinder/ designator (LARD) during the refinement phase of the targeting system or the tracking phase of the armament system. Once the target is passively located, the LRD directs a laser beam at the source of the RF signal and upon analysis of the reflected beam, a precise range to the threat is calculated. The laser range is used to further correlate the target location with the computed line-of-sight range to generate a high precision target location. The precise location and range of the RF source is used by the onboard armament system or is transmitted to other platforms for use in a coordinated mission.

DESCRIPTION OF THE PREFERRED EMBODIMENT

Figure 1:
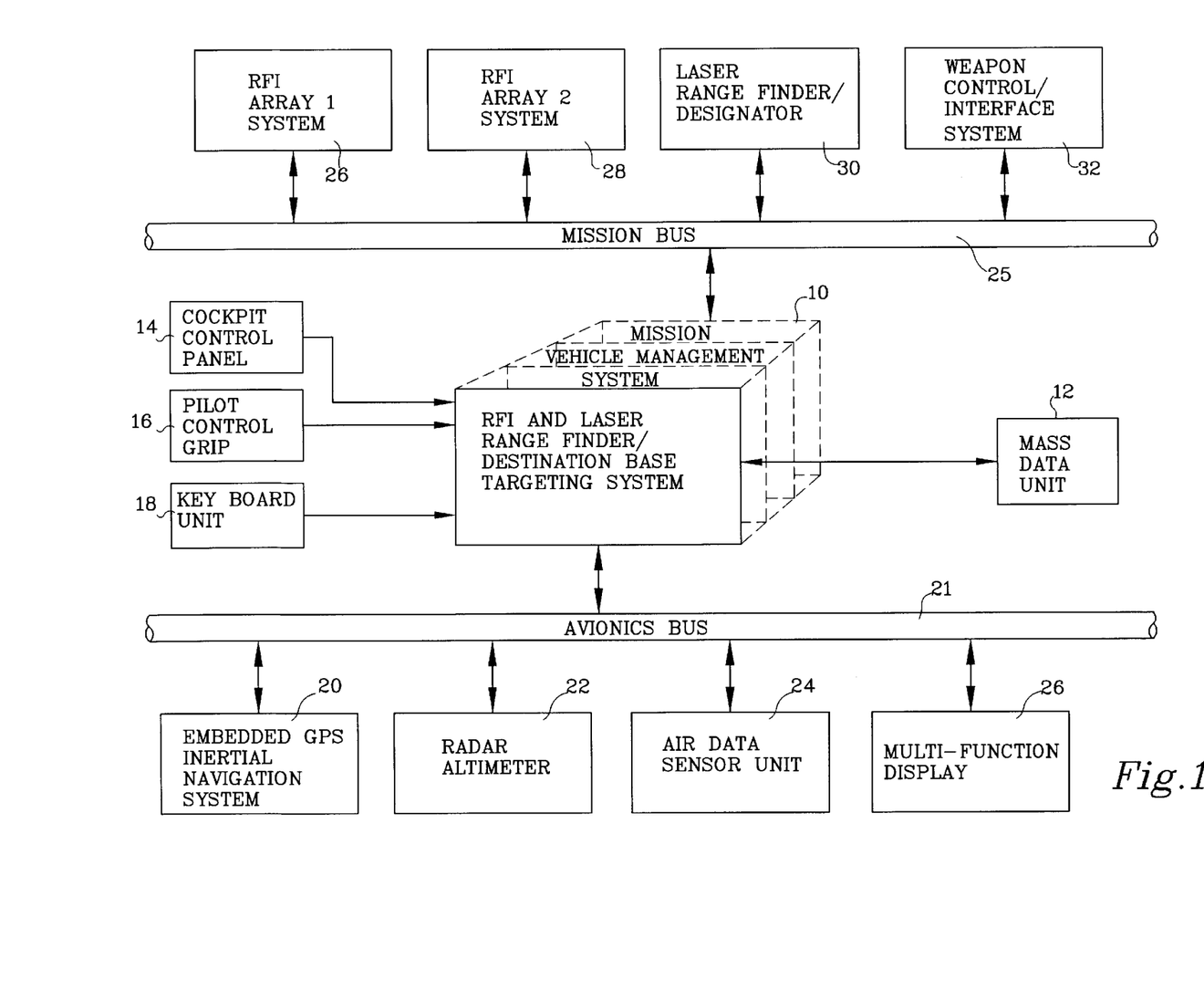
FIG. 1 shows a block diagram for the RFI/LRD-Based Targeting System.

Disclosed in FIG. 1 is a system diagram for the RFI and laser range finder/destination based targeting system. In this embodiment of the invention, the targeting system is embedded in the vehicle management system 10 for the vehicle. The vehicle mission management system is a combination of control, display, and data processing systems each well known in the art. The hardware elements of the assembly provides digital data processing, bus input/output processing, and analog signal input/output. The vehicle mission management system provides control, management, and data processing for mission equipment such as electronic warfare, weapons control, communications, and navigation. The vehicle mission management system 10 receives various inputs from various vehicle systems & sensors, and in turn provides output signals which are either displayed to the pilot, transmitted to the weapons systems, or provided over a datalink to other vehicles.

Inside the vehicle cockpit the pilot can provide input to the vehicle management system 10 through the cockpit control panels 14, the pilot control grip 16, and a keyboard unit 18 upon which commands can be entered. The vehicle management system 10 also has a direct connection with mass data unit 12. The data unit stores a variety of information necessary for the targeting system that includes a digital terrain elevation database (DTED). The DTED is a digital reconstruction of the geography over which the vehicle will fly or drive. Also included in the data unit are the locations of known targets and battlefield graphics.

The targeting system is connected to other systems throughout the vehicle through communication buses. In the preferred embodiment of the invention, the vehicle is an aircraft and the systems connected through the avionics bus 21 are typical aircraft systems. The primary purpose of the targeting system is to allow the pilot to identify and locate potential targets during missions without initially emitting any active signals. If a precise range to the target is desired, this can be determined using the onboard television/thermal imaging system in conjunction with a laser rangefinder/designator (LRD). Once the target is precisely located this information may be stored in memory, passed on to other aircraft so that they may target their weapons, or used to target with the onboard weapon systems. In the preferred embodiment, the targeting system is implemented with firmware in the vehicle management system of the aircraft.

Through the avionics bus 21, the targeting system is interfaced with various vehicle sensors and display systems. The embedded Global Positioning System (GPS)/Inertial Navigational System (INS) 20, provides specific information on the present location, altitude, heading, and speed of the aircraft in a known reference frame. The radar altimeter 22, provides precise altitude measurement and vertical speed of the aircraft. The air data sensor unit 24, provides pressure, altitude, and airspeed for the aircraft. Finally, the multi-function display which is mounted in the cockpit provides the pilot with horizontal and vertical situation display and all pertinent mission related information generated by the targeting system.

An array of passive and active sensors, as well weapon system control, connects with the targeting system 10 through mission bus 25. The two passives sensors are the Radio Frequency Interferometer (RFI) Array 1 system 26 and RFI Array 2 system 28. The two RFI arrays are mounted on the exterior of the vehicle and detect the emission of RF signals. By analyzing the RF signals received at the arrays, an angle of arrival and range from the center of each array to the source can be computed in a passive manner. The RFI arrays will be discussed in greater detail below.

The LRD 16 is a laser sensor which provides precise range measurements from the vehicle to the target. A laser is pointed at the desired target and based on measurements of the reflected beam, the distance to the target can be precisely calculated. Finally, the weapon control/interface system 32 with seeker and slaving commands from the targeting system, points the weapons at specific azimuth and elevation corresponding to the appropriate target and fires upon command.

The present invention can operate in three different modes. In the first mode, only the passive sensors are used in order to detect and then locate target positions which are emitting RF signals. In second mode, the LRD is used in conjunction with the passive sensors in order to provide a precise location of the target. In this mode, the RF sensors provide a location of the RF source, the pilot makes a visual sighting of the target using the television/thermal imaging system on the vehicle, and then the laser sensor is pointed at the RF source and a precise range is calculated. The advantage of operating with the passive sensors in the first mode is that a target can be identified and located without emitting a signal, such as an RF signal or laser beam, which may be detected. In the cases where a high precision location of the target is necessary in order to support a specific weapons system or to provide target position to other vehicles, the laser is activated in a short burst, and the beam is reflected off the target and the exact range is then calculated.

In the third mode, the situation may exist where one of the two RFI arrays is inoperable. In that case, a single RFI array can be used to identify the direction from which the RF signal is coming. In that situation, television/thermal imaging system is used to make a visual sighting of the target and then the laser is used to obtain a precise distance.

Figure 4:
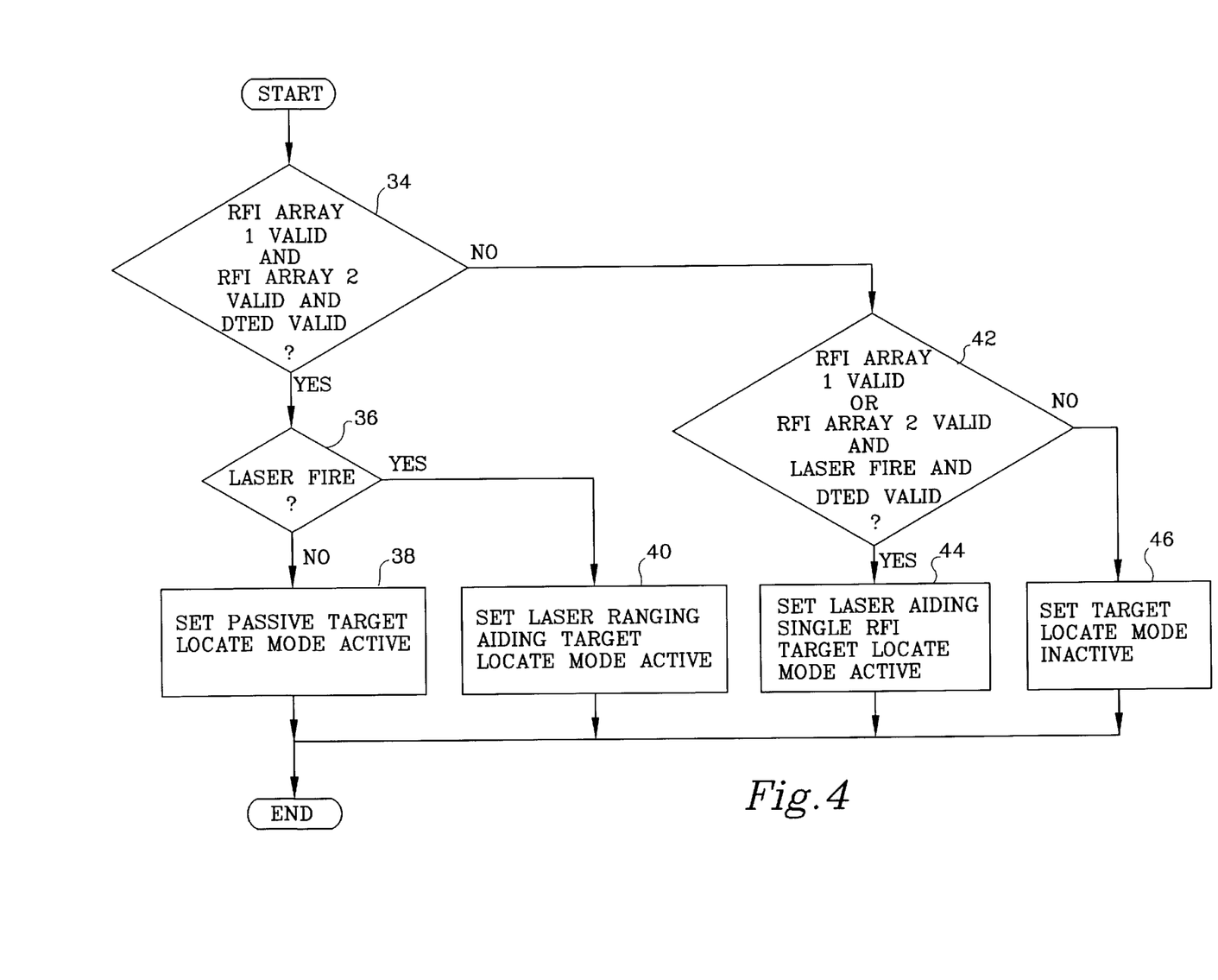
FIG. 4 is a flow diagram for establishing the system mode of operation.

The flow chart in FIG. 4, describes the process for determining which mode the targeting system will operate. According to the decision blocks in the flowchart, the system evaluates the validity of the on-board sensors such as the operation of the RFI array and the DTED, which in turn automatically determines which mode the system should operate. At step 34 an inquiry is made as to whether both the first and second array and the digital terrain elevation data base are operational. If they are, at step 36 an inquiry is made as to whether laser sensor is operational and has been fired. The pilot at 36 determines whether or not he chooses to use the laser sensor. If he does not use the active sensor, the passive target locate mode (first mode) is set to be active. If the determination is made at step 36 that the laser will be used in addition to the passive sensor, at step 40 the laser ranging aiding target locate mode (second mode) is set to active at step 38. If at step 34, a determination is made that one of the arrays is not active, at 42 a determination is made as to which array is not active or if either is active. If it is found that one of the arrays is active at step 44, the laser aiding single RFI target locate mode (third mode) is set to active. If neither array is active at step 46 the target locate mode is set to inactive.

Once the mode is determined, the system goes into the current operational mode to begin processing target positions and range data. The flow chart in FIG. 5 describes the operation of the system. At step 60, the RFI, LRD, and terrain data is read. At step 62, a query is made as to whether either of the arrays is operational. If they are, at step 64, the RFI target data processing is correlated to determine if the target database has been updated or there are new targets detected based on frequency range, signal amplitude, signal level sensitivity, and angle of arrival. At step 66, the mode of the targeting system is determined. At step 68, a query is made as to which mode is active. This flow chart gives a general overall view of the operation of the system and each of the sub systems will be described in more detail below.

Figure 5:
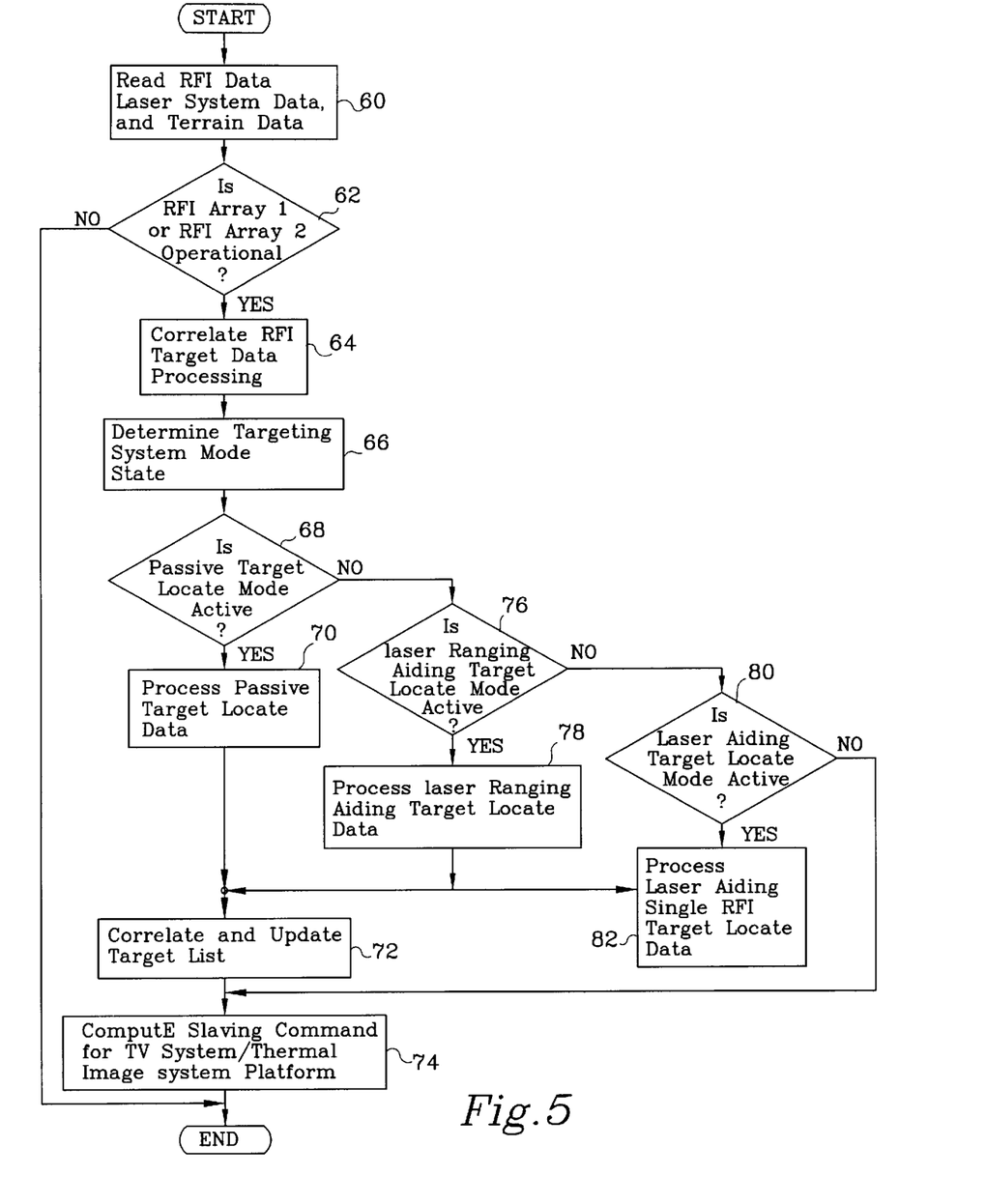
FIG. 5 is a block diagram which describes in general the operation of the targeting system.

If it is determined that the passive target mode is active, at step 70 the data gathered through the passive sensors is then processed. At step 72 the data is correlated with the previous target in the list in terms of old and new targets to provide a unique set of targets. With the target detected and located, slaving commands comprised on azimuth and elevation relative to the aircraft body axes for pointing the television/thermal imaging systems are then computed. Based on information gained from these systems, the pilot may then select to aim the active sensors at the target.

If at step 76 the laser ranging aiding target locate mode is active, the laser is activated and the ranging data is gathered then processed at step 78. The data is correlated and the target list is updated at 72. As with the passive locating data, it is used to calculate slaving commands for both the television/thermal imaging system and the weapons system.

Finally, a query is made at step 80 as to whether the laser aiding target locate mode is active. If it is active, the data gathered through the sensors is processed at 82 and is used to correlate and update the target list at 72. Once again the data is used to compute slaving commands for both the television/thermal imaging system and the weapons system. The detailed operation of the system in each mode is described in more detail below.

Figure 2:
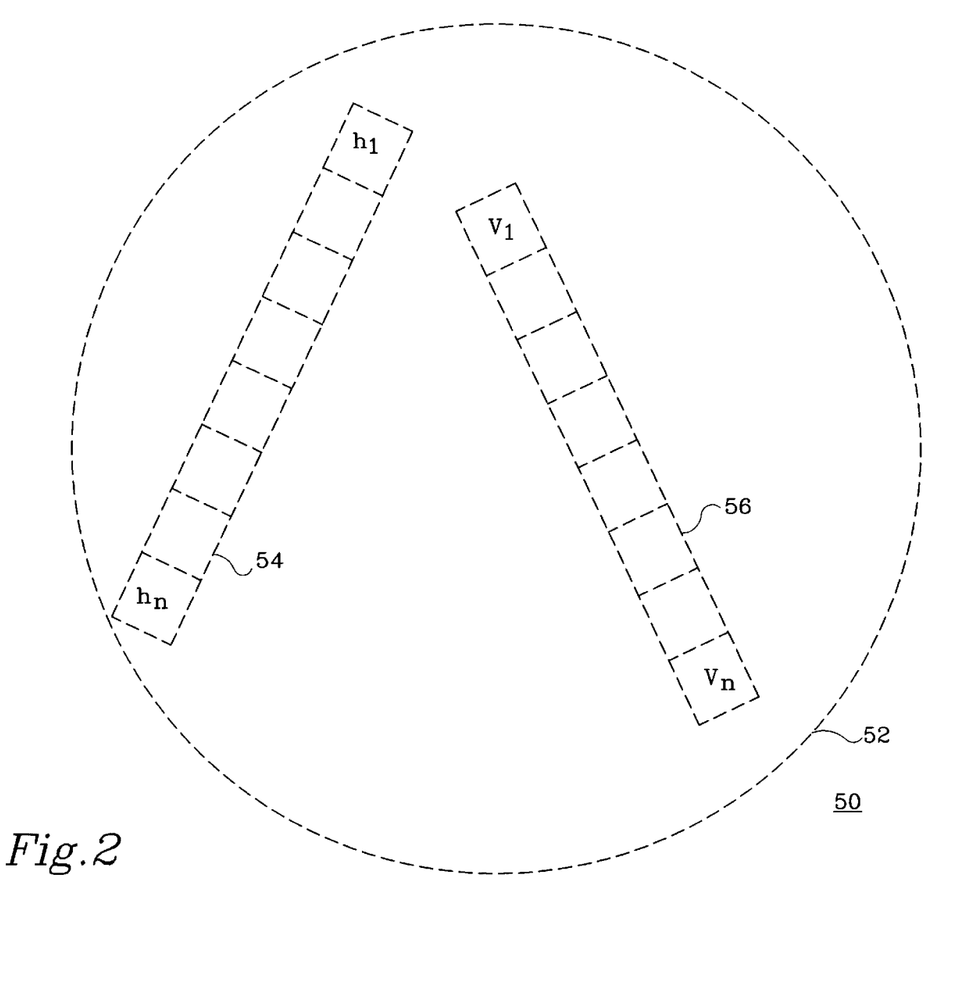
FIG. 2 shows an antennae with linear arrays of RFI's aligned in the common plane.

In the preferred embodiment of the invention, the RFI arrays are used as a passive sensor to detect the positions of targets. Reference is now made to FIG. 2 which illustrates this aspect of the invention. As seen herein, a dual radio frequency interferometer sensor 50 includes a first linear array 54 which is comprised of sensor elements hl-hn and a second linear array of sensors comprising elements vl-vn. Each element, due to its relative distance to the RF source, receives the signal at different times. The phase shift in the signal will allow the determination of the angle of arrival. In the preferred embodiment, the linear arrays are arranged at a known angle to one another and are located in the same geometric plane 52.

Figure 3:
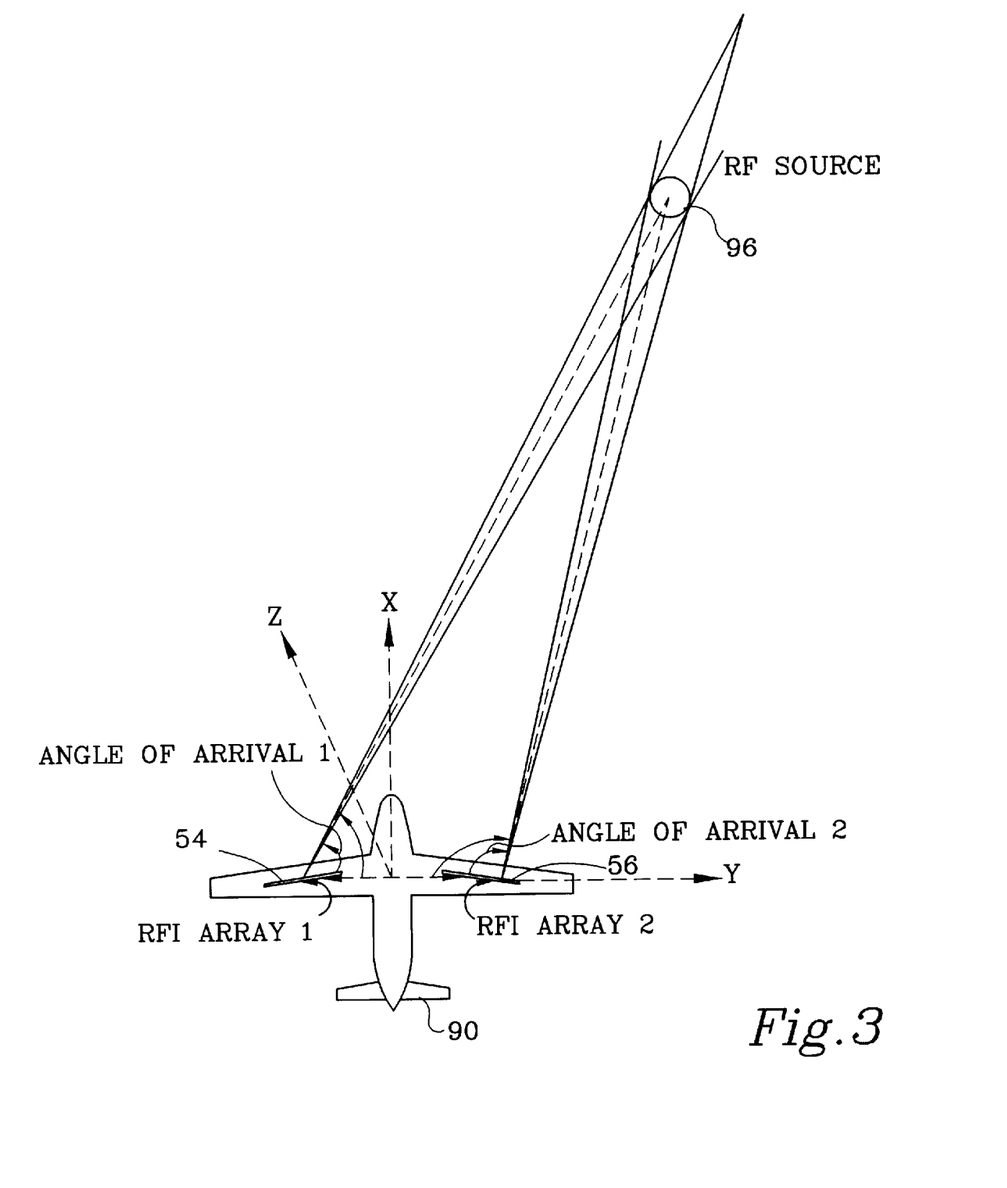
FIG. 3 shows a diagram of RFI's mounted on the wings of an aircraft and how radio signals are received from the target.

Shown in FIG. 3 is the mounting of the RFI arrays on the vehicle. In the preferred embodiment, the arrays are mounted on opposite wings. As mentioned above, the arrays are in the same geometric plane, and the angles of the arrays relative to the body coordinates of the aircraft are known values at the time of the RFI array installation. Then using the embedded GPS/INS system, the location and orientation of the aircraft in inertial space is determined. By orienting the sensor elements in a linear manner and monitoring the signals received by the arrays, the angle of the arrival relative to the source of an RF signal can be determined. Each sensor element perceives an RF signal and produces an electric signal indicative of the sensed RF signal. The phase angles of all the signals produced by the array are then compared with one another and an angle of arrival is determined therefrom. As previously mentioned, the angle of arrival as determined by a single array identifies a plane relative to the linear array in which the RF signal source 96 exists.

In practicing the present invention, a first angle of arrival of an RF signal is determined using the first linear array 54 and a second angle of arrival is determined using the second linear array 56. Dual arrays, in accordance with the invention, thereby provide the capability of determining an accurate directional vector to the RF source. The arrays 54 and 56 are entirely passive (i.e. not signal emitting) and therefore the RF signal source or threat is not made aware that it is being identified and located. The system does provide an instantaneous position and a line-of-sight vector from the aircraft to the signal source or threat, as will be explained hereafter. Further more, control signals are generated to cue other sensors to the threat and to provide the pilot with flight director cues to orient the aircraft so that the target can be in the field-of-view of the television/thermal imaging system. Utilizing the cues provided, the pilot can then steer toward or away from the RF signal source or make some final adjustment before initiating engagement of the weapons system.

Figure 6:
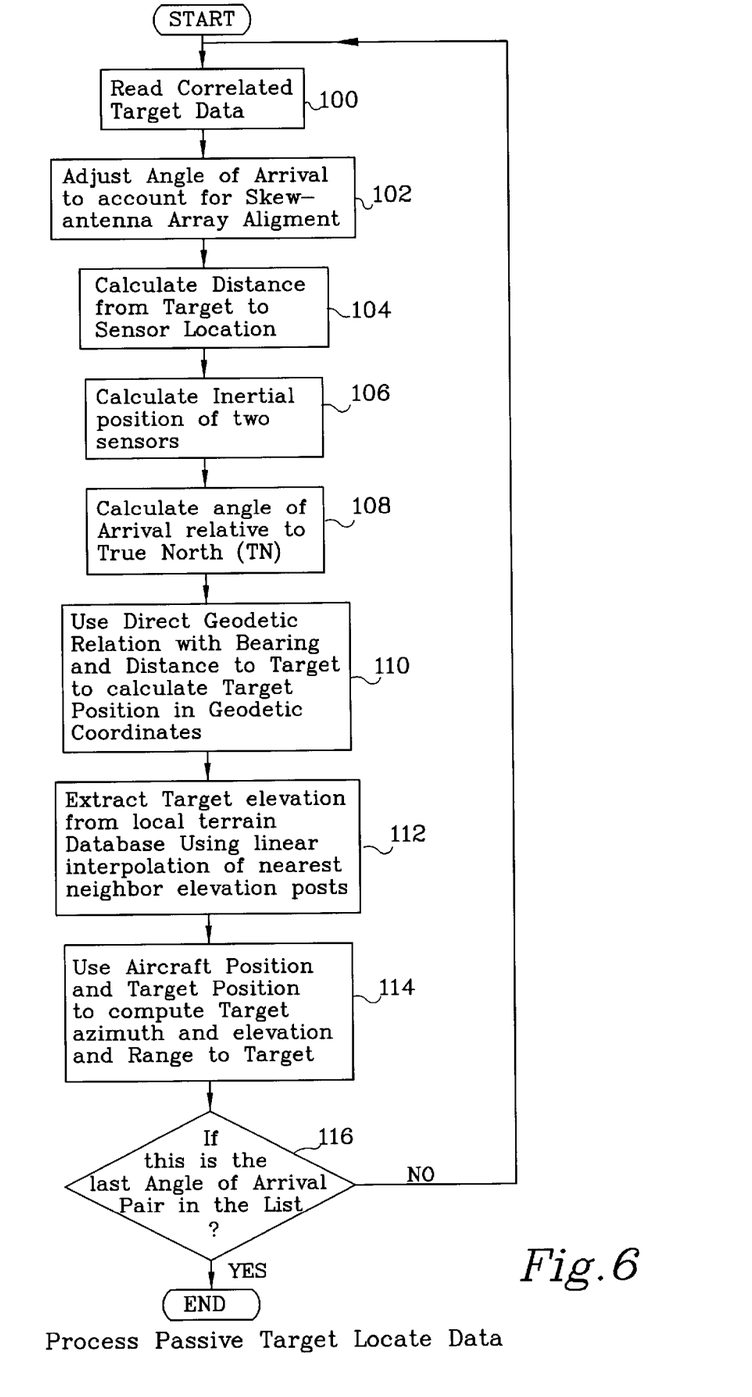
FIG. 6 is a flow diagram which describes the processing of target information when the targeting system is in the passive mode.

The flow chart in FIG. 6 describes in detail the process in which the tracking system uses in order to calculate the position of a RF signal emitting target relative to the vehicle. The process begins after the arrays have detected the signal. In step 100, the target data is downloaded from the arrays and correlated for operating frequency, signal amplitude, signal sensitivity level to match pairs of angles of arrival from each target as was described in FIG. 5. At step 102, the angle of arrival of the RF signal is adjusted for any skew angle of the antennas relative to the x-axis (latitudinal) of the aircraft body. At step 104 the distance from the target to the sensor location is then calculated based on the known distance between the centers of the two RFI arrays and adjusted angles of arrival to each array. At step 106, the inertial position of the RFI array relative to the aircraft in terms of offset lever arm corrections is calculated and then with range to target and bearing to target from the center of each RFI array, the geodetic position associated with each pair of angle of arrivals in terms of latitude and longitude is computed.

At this point, the angle of arrival of the RF signals are calculated relative to true north (TN) at step 108. Once the angle of arrival is calculated, direct geodetic relations with bearing and range to target, along with the aircraft's present position, are used to calculate the position of target in geodetic coordinates. With the target now located in geodetic coordinates with latitude and longitude, the three dimensional inertial space can be determined by accessing the digital terrain database in mass data unit. The two dimensional location of the target is transposed onto the digital terrain and using linear interpolation of the nearest neighboring elevation posts, the elevation corresponding with the previously computed position of the target is identified at step 112. At step 114, the aircraft position and heading, as well as the target position are used to compute target azimuth and elevation and range to target. At step 116 a query is made as to whether the last pairs of radio signals received on the RFI dual arrays has been processed.

Operating in the multi-threat environment, the dual RFI arrays receive and process a list of radio signals with many different variations in signal characteristics which are emitted from many different RF sources. Because there are multiple targets to identify and locate, it is important that the same radio signal that is received at array number 1 is compared with the same radio signal which is received at array 2 to provide matched-up pairs of angle of arrivals. The flow chart in FIG. 7 describes the correlation process for properly pairing the angle of arrival associated with each of the radio signals.

Figure 7:
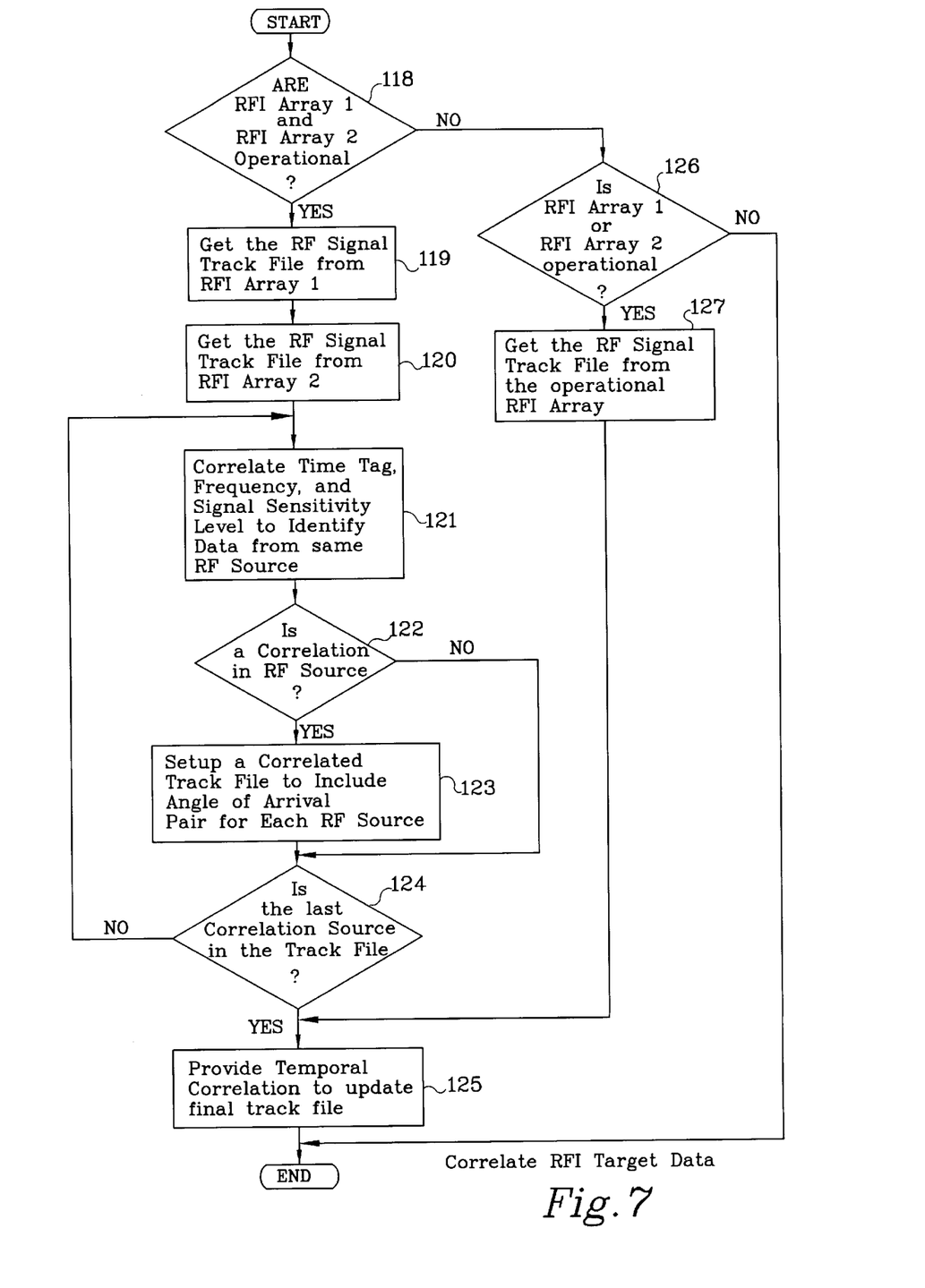
FIG. 7 is a flow diagram which describes the process of pairing up the target radio signals which are received at the RFI arrays.

At step 118 in FIG. 7, an inquiry is made as to whether both array 1 and array 2 are both operational. If they are at step 119 and step 120 the track files are received from the respective arrays. At step 121, a comparison is made between the information such as time tag, frequency, signal amplitude, and signal sensitivity, of an RF source in the track files of the first RFI array, to the information of another RF source contained in the track file of the second RFI array to determine whether the data is from the same RF source. At step 122, a query is made as to whether there is a correlation in the RF sources. If a correlation is made, a track file is set up for the RF signals to include angle of arrival pair for each RF source and associated data. At step 124 a query is made as to whether a correlation has been made for every source in the track file.

If at step 122 a correlation between the two selected RF sources is not made, a further query is made at step 124 as to whether all the track files have been analyzed. If they have not, the process returns to step 121 and the next RF source in the track file is chosen and a correlation is made. At step 125, a temporal correlation is made to remove the old data belonging to the RF sources which have been identified and located. The track file is then updated with the new RF source data.

If at step 118, it is found that either or both of the arrays is not operational, the determination is made at step 126 as to which array is operational. If neither is operational the process ends. If one of the arrays is operational at step 127 the RF signal is taken from the track file for the operational array and at step 125 a temporal correlation is provided to update the final track file for use in processing the target position in one of the three modes. When the process is complete, all track files from both arrays or a single array have been correlated and the position of the RF source can then be determined.

Figure 8:
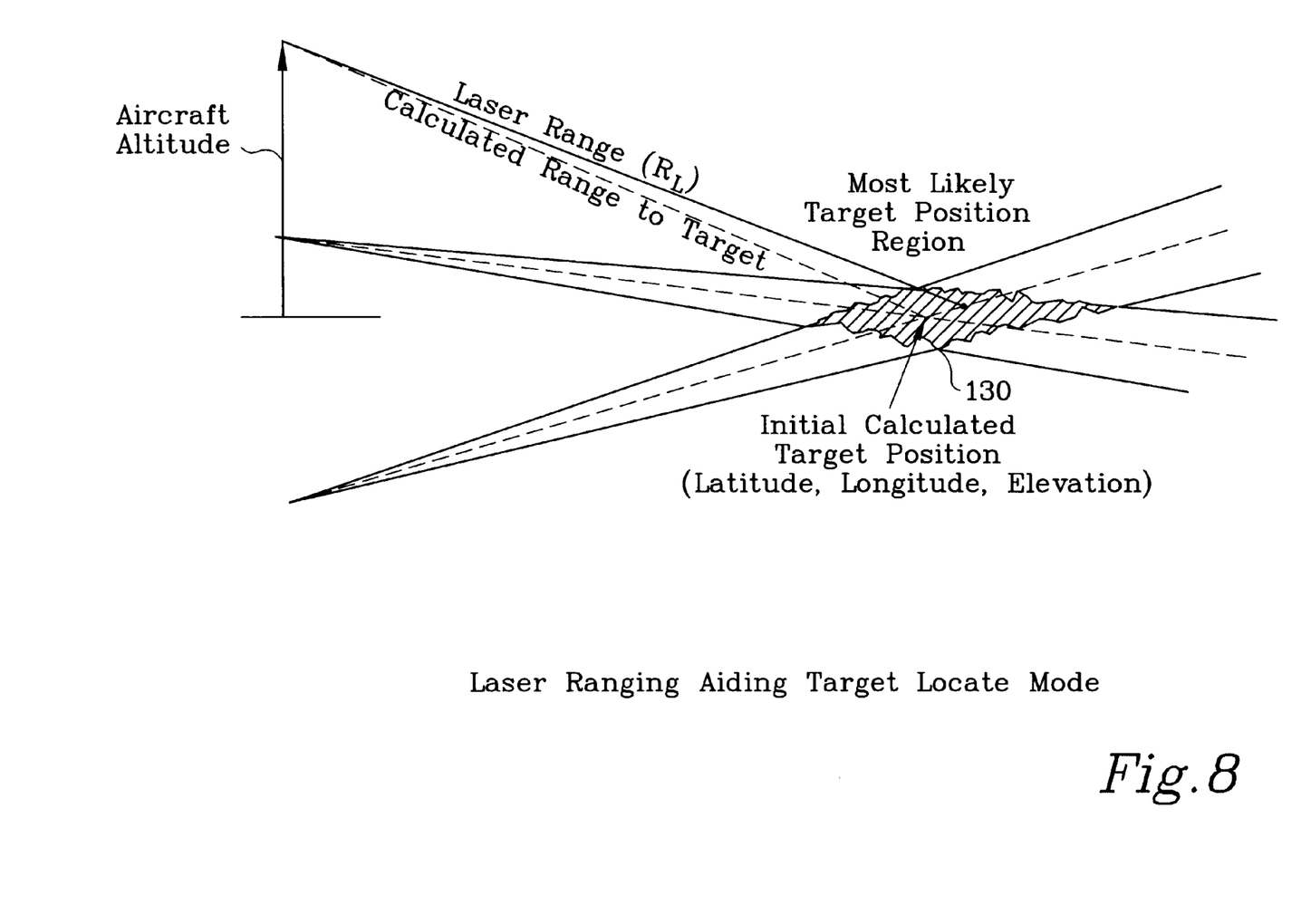
FIG. 8 discloses the area in the which the target may be located during the laser ranging aiding target locate mode.

Because there is some error built into the passive ranging method described herein, the combination of the visual sighting for refining adjustment plus the laser ranging is necessary in order to provide a higher precision position for the detected target. FIG. 8 shows the possible errors which may exist when calculating the arrival angles for the RF signals. The diamond shaped area 130 is the potential area in which the target position is most likely to exist. The flow chart in FIG. 9 describes the process in which the passive sensors and the active sensor (laser) is used in order to provide the position of the detected target.

Figure 9A:
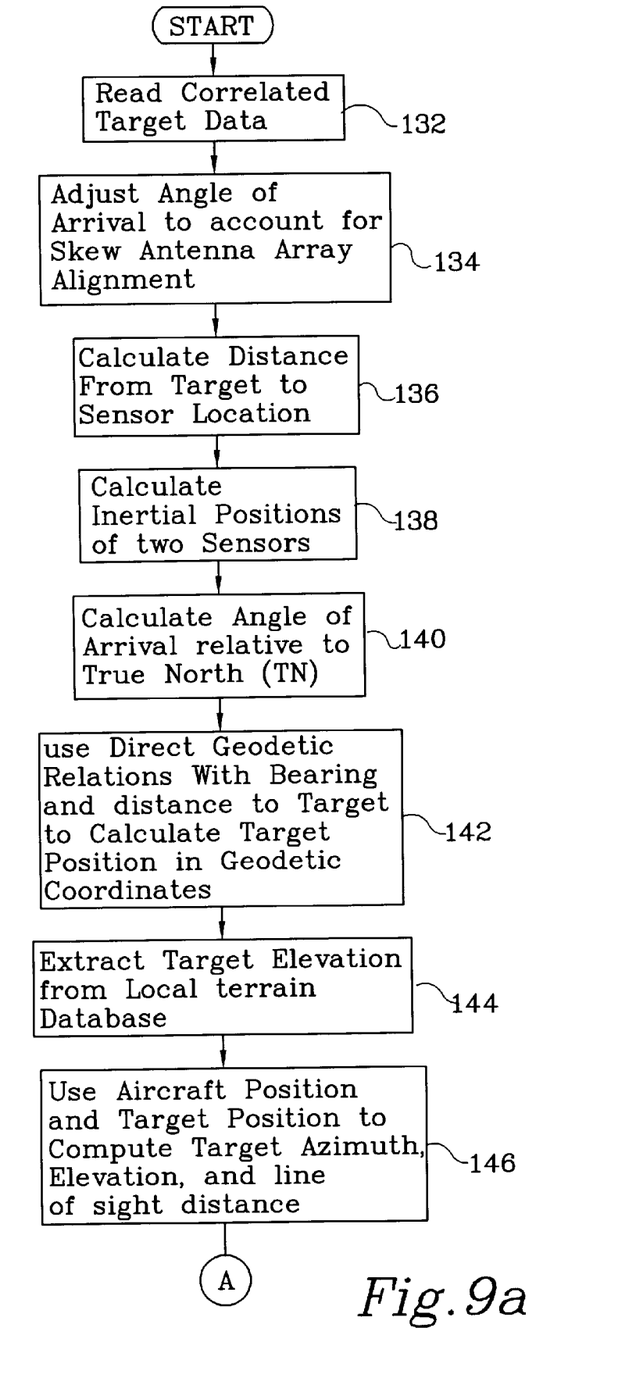
FIG. 9 is a flow diagram which describes the laser ranging assisting the passive sensors.
Figure 9B:
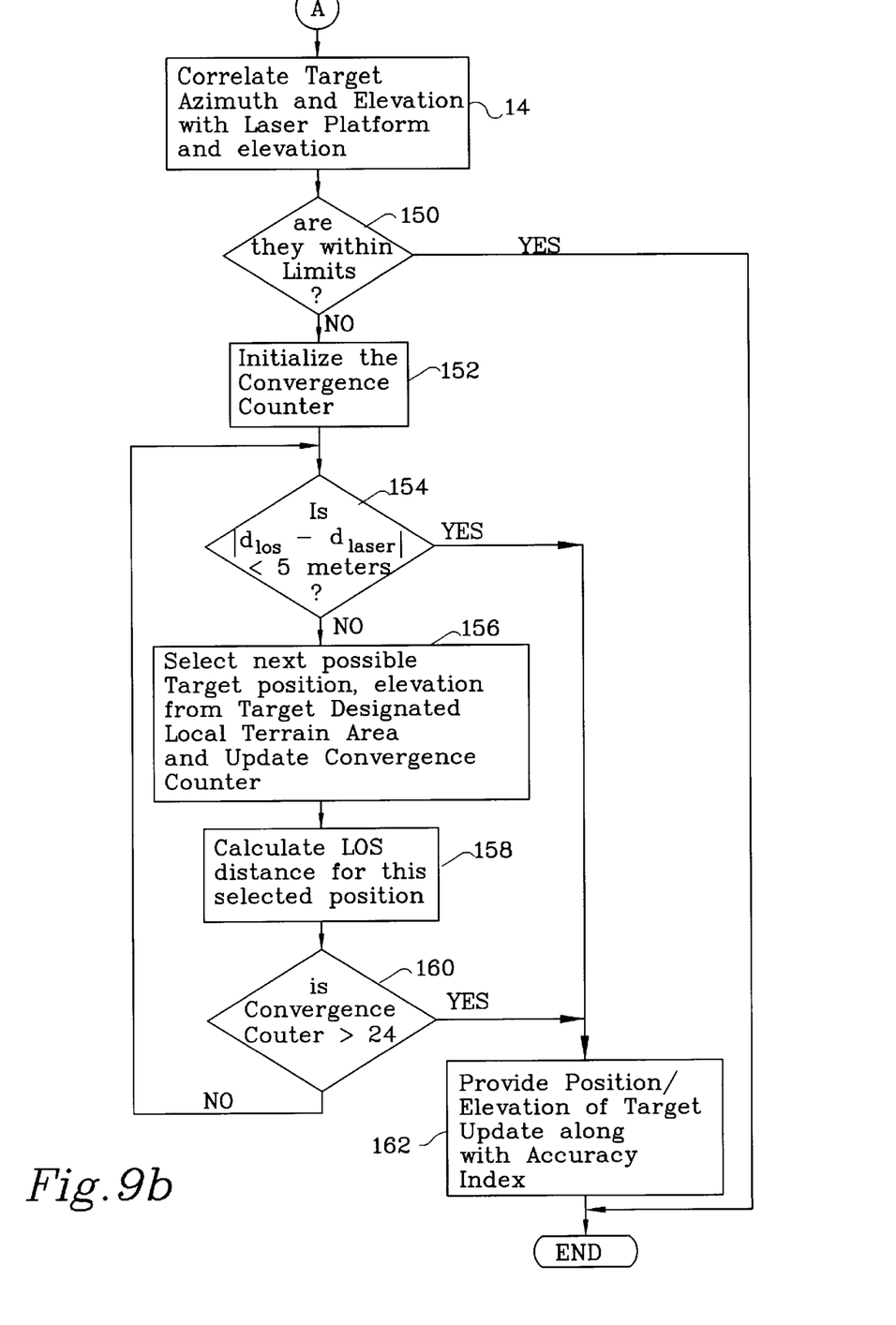
Figure 10:
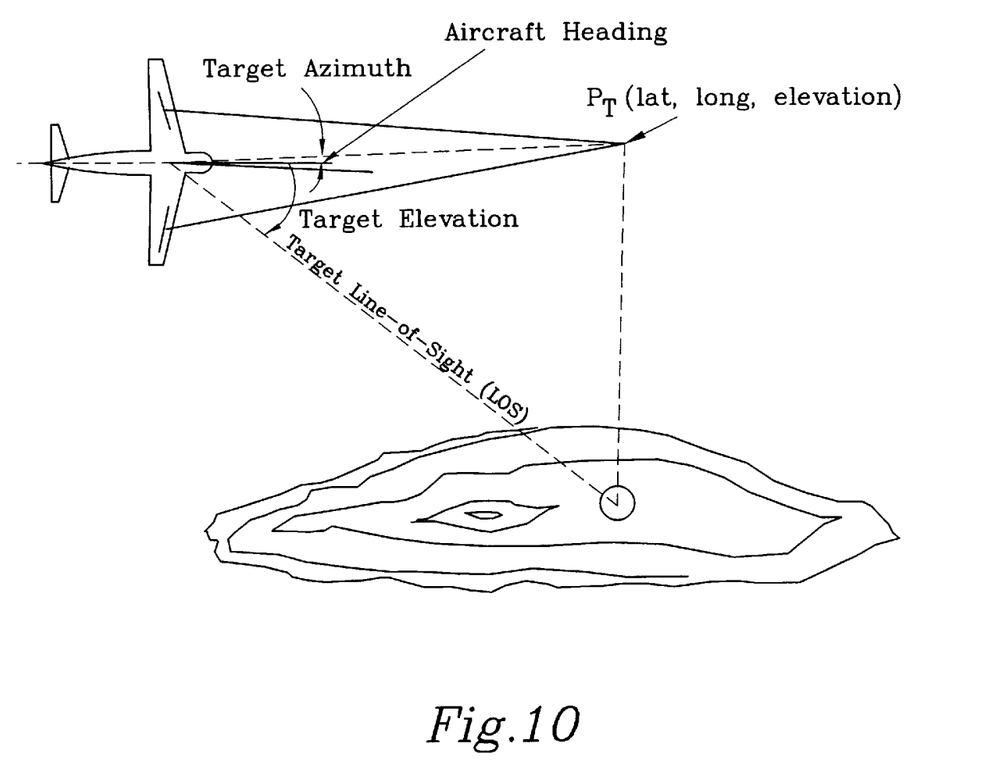
FIG. 10 discloses the identification of the line of sight from the aircraft to the target.

Before the process described in FIG. 9 begins, a precise location of the target is calculated using the passive sensors as was described previously in FIG. 6 in conjunction with the passive sensors. The digital terrain database is then used to further refine a target location. With the information provided by the passive sensors, the pilot makes a visual sighting of the target using the television/thermal imaging system and then lazes the laser to obtain the precise range. So that this information may be useful to other aircraft either on the current mission or in the future, the detected target must be precisely correlated with a location in the digital terrain elevation database. In order to do this, a line of sight range must be calculated first from the position of the aircraft to the position of the target as determined by the passive sensors. FIG. 10 shows a diagram of how the line of sight is calculated. When the passive sensors detect the RF signal emitted by the target, a calculation is made which determines the target location. Then the DTED is used to extract the elevation at the computed target location using the elevations of the terrain points in the neighborhood of the computed target location. As was mentioned above, this is the scanning and search process for locating the target. The process shown in FIG. 9 further enhances the accuracy of the passive sensors.

After location has been calculated passively, at step 147, a visual sighting is made of the target using the television/thermal imaging system. At step 148, after the laser determines a precise range to the target, correlation process is performed to match the detected target with a target stored in the database. At step 150 a comparison is made between the azimuth and elevation of the detected target and the laser platform to determine if they are within an specified threshold. If they do not meet these conditions, the process ends.

If they are within this specified threshold, that means the laser range is associated with one of the located targets. At step 152, the conversions counter is then initialized so that the scanning of points within the margin of error range can be analyzed. At step 154 a query is made as to whether the line-of-sight range computed from the aircraft to the target position and the distance measured by the laser sensor (laser range) are within five meters of each other. If they are not, at step 152 the next possible target position in the neighborhood of the target is identified. At step 158 a line-of-sight is then calculated to this new possible target. Because this will only be done a certain number of times, at step 160 a query is made as to whether the conversions counter is greater than 24. If it is, the process ends and the point with the closest position is provided to be stored in the mass data units along with the elevation of the target position as well as the accuracy index. If at step 154 the line-of-sight range is within five meters of the laser sensor measurement, an accurate match has been made and this information is stored in the mass data unit.

Figure 11:
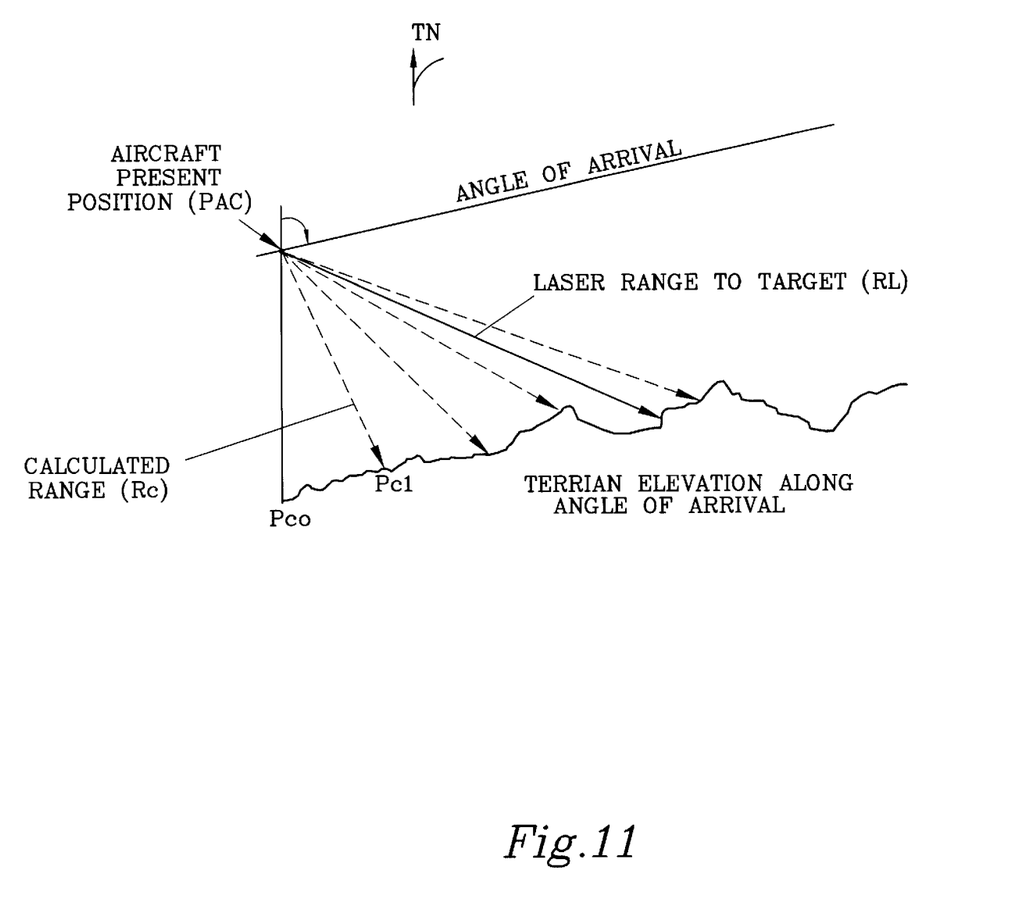
FIG. 11 discloses the laser ranging aiding of the system when only a single RFI array is operational.

The final mode which the targeting system operates is the of a single RFI array aided by the laser sensor. The mode of operation is described in detail in FIG. 12. In step 170, because only a single RFI array is being used, only the angle of arrival of the RF signal can be detected. Once the angle is detected the pilot uses the visual cues to scan along this angle on the actual terrain to make a visual sighting of the target at step 172. At step 174, the laser sensor is then used to calculate a precise range to the target. In order to match the visually detected target with the digital database, a set of possible target positions along the angle of arrival are identified in step 174. At step 176 the elevation heights for these potential targets are calculated. At step 178 a line of sight from the aircraft to the possible target positions is then calculated. This process can be better understood by study of FIG. 11. FIG. 11 shows the cross section of the terrain along the angle of arrival detected by the single RFI. Once the visual identification is made, the laser range to target (RI) is positively identified. The targeting system then identifies a series of possible target positions along the terrain at set intervals.

Figure 12:
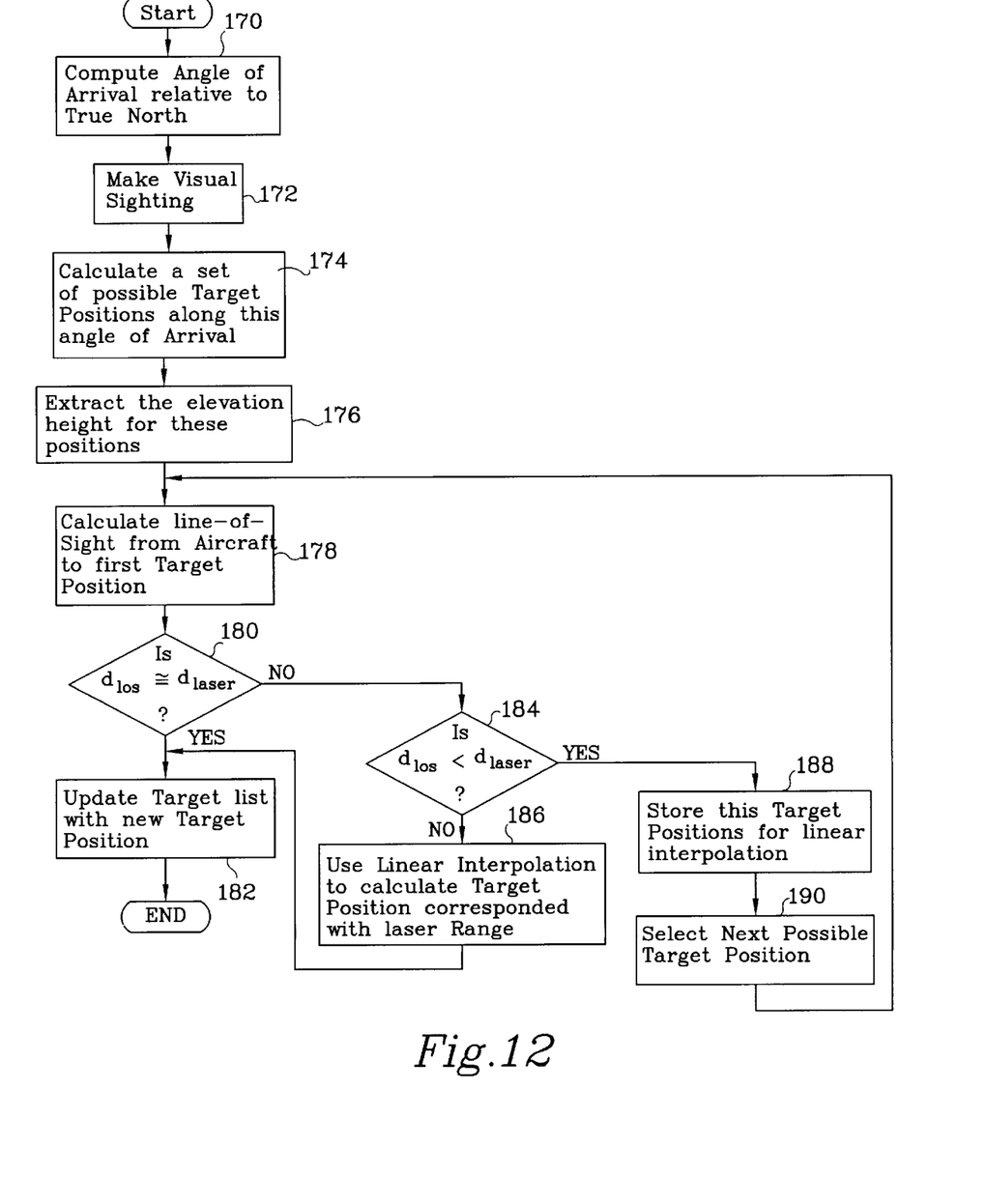
FIG. 12 is a flow diagram which describes the laser ranging aiding of a single RFI array.

Continuing in the flow chart in FIG. 12, for each line of sight calculated, it is then compared to the value determined by the laser sensor at step 180. If the two values are not approximately equal at step 184 a query is made as to whether the line of sight measurement is less than the laser measurement. If it is still less, at step 188 this is stored in memory and at step 190 the next target position along the cross section is chosen. If at step 184 the line of sight had become greater than the laser value it is then determined that the location of the target is between the current target position and the previous line of sight target position. At step 186 linear interpolation is then used to calculate the target position between these two line of sight values which corresponds with the measurement made by the laser sensor. Once this position is determined, the target list in the mass data unit is updated and this information can be provided to other aircraft.

We claim:

1. A threat detection and weapons targeting system for a vehicle comprising:
    a first linear array which receives radio signals and is positioned on said vehicle at a known angle relative to a first axis of a reference coordinate system;
    a second linear array which receives radio signals and is positioned on said vehicle in the same geometric plane as the first array and at an angle relative to the first axis of the reference coordinate system;
    means connected to said first and second linear arrays to determine first and second planes in which the radio signals are received, the first and second planes comprising respective coordinates from the first axis and from a second axis and an angle of arrival of the radio signals; and
    means to convert the first and second planes to a directional vector relative to the vehicle, taking into account the orientation of the first and second linear arrays relative to the reference coordinate system and the orientation of the vehicle relative to the reference coordinate system.

2. The passive threat detection system of claim 1 further comprising:
    an aircraft navigation system for providing a position signal indicative of the airframe position relative to an inertial coordinate system and a flight dynamics signal indicative of the dynamics of the airframe relative to said inertial coordinate system;
    means for providing a line-of-sight vector based on said position signal and said flight dynamics signal; and
    coordinate transformation system for receiving said position signal, said flight dynamics signal, and said line-of-sight vector, said coordinate transformation system for producing a pointing vector in response to said position signal, said flight dynamics signal, and said line-of-sight vector, said pointing vector extending from said airframe to the source of radio signals in said inertial coordinate system.

3. The passive threat detection system of claim 1, wherein said first linear array comprises a first plurality of interferometer sensors arranged in a substantially linear arrangement and said second array comprises a second plurality of interferometers arranged in a substantially linear arrangement, said interferometers each responsive to the radio signals.

4. The passive threat detection system of claim 3, wherein said first plurality of interferometer sensors produces said first directional signal and said second plurality of interferometer sensors produces said second directional signal.

5. The passive threat detection system of claim 4 further comprising:
    a terrain elevation database for receiving said position signal and producing a plurality of elevation signals indicative of the elevation the terrain proximate to said airframe position; and
    an inertial positioning system for receiving said pointing vector and said plurality of elevation signals and producing an inertial position signal indicative of the position of the source of radio signals relative to said inertial coordinate system.

6. The passive threat detection system of claim 5 further comprising range determination system for receiving the pointing vector and said position signal and further producing a range signal indicative of the distance from the airframe to the source of RF energy.

7. The passive threat detection system of claim 6, wherein said first plurality of interferometer sensors produces said first directional signal and said second plurality of interferometer sensors produces said second directional signal.

8. The passive threat detection system of claim 1 further comprising:
    a processing means which receives the vertical and horizontal angles from the first linear array and the second linear array and identifies the target in relation to the terrain and generates a directional signal for pointing the vehicle and vehicle systems towards the target; and
    an active sensor which is slewed toward the target in response to the directional signal, said active sensor emits a signal which rebounds off the target and returns to the active where a precise distance calculation is made and provided to the processing means, which in turn is transmitted to the pilot of the vehicle as well as the weapons system.

9. The target detection and weapons targeting system for a vehicle of claim 8, wherein the active sensor is a laser which provides very accurate ranging to target for weapons system aiming.

10. The target detection and weapons targeting system for a vehicle of claim 8, wherein the processing provides cues to the pilot of the vehicle as to target direction.

11. The target detection and weapons targeting system for a vehicle of claim 9, wherein the pilot manually controls the pointing of laser in response to cues from the processing means.

12. The target detection and weapons targeting system for a vehicle of claim 8, wherein a datalink in connection with the processing means provides target information to other platforms, satellites, and ground-based stations.

13. The target detection and weapons targeting system for a vehicle of claim 8, wherein the pilot of the vehicle manually slews the active sensor towards the target.

14. A threat detection and weapons targeting system for a vehicle comprising:
- a passive sensor that detects emissions from a target;
- a processing means that determines vertical and horizontal angles from the vehicle to the target based on emissions detected by the passive sensor and identifies the target in relation to the terrain and generates a directional signal for pointing the vehicle and vehicle systems towards the target; and
- an active sensor which is slewed toward the target in response to the directional signal, said active sensor emits a signal which rebounds off the target and returns to the active sensor where a precise distance calculation is made and provided to the processing means, which in turn is transmitted to the pilot of the vehicle as well as the weapons system.

15. The target detection and weapons targeting system for a vehicle of claim 14, wherein the passive sensor detects a source of a radio frequency signal, said passive sensor comprises:
- a dual axis radio frequency sensor having a first array of sensors for sensing the radio frequency signal and outputting a first directional signal indicative of the direction from which the radio frequency signal is received relative to said first array of interferometers and a second array of sensors for sensing the radio frequency signal and outputting a second directional signal indicative of the direction from which the radio frequency signal is received relative to said second array of interferometers; and
- a directional processor for receiving said first directional signal and said second directional signal and producing a line-of-sight vector signal indicative of the direction from which the radio frequency signal is received by said dual axis radio frequency sensor relative to the airframe.

16. The target detection and weapons targeting system for a vehicle of claim 15, wherein the radio interferometer is two antennas that are positioned at other than 90 degrees relative to each other.

17. The target detection and weapons targeting system for a vehicle of claim 16, wherein the radio interferometer determines range to the target.

18. The target detection and weapons targeting system for a vehicle of claim 14, wherein the active sensor is a laser which provides very accurate ranging to target for weapons system aiming.

19. The target detection and weapons targeting system for a vehicle of claim 14, wherein the processing provides cues to the pilot of the vehicle as to target direction.

20. The target detection and weapons targeting system for a vehicle of claim 18, wherein the pilot manually controls the pointing of laser in response to cues from the processing means.

21. The target detection and weapons targeting system for a vehicle of claim 14, wherein a datalink in connection with the processing means provides target information to other platforms, satellites, and ground-based stations.

22. The target detection and weapons targeting system for a vehicle of claim 14, wherein the target information is transmitted from the vehicle to other platforms or a ground station via a datalink.

23. The target detection and weapons targeting system for a vehicle of claim 14, wherein the pilot of the vehicle manually slews the active sensor towards the target.

24. A threat detection and weapons targeting system for a vehicle comprising:
- a first linear array which receives radio frequency energy and is positioned on said vehicle at a known angle relative to a first axis of a reference coordinate system;
- a second linear array which receives radio frequency energy and is positioned on said vehicle in the same geometric plane as the first array and at an angle relative to the first axis of the reference coordinate system;
- means connected to said first and second linear arrays to determine first and second planes in which the radio frequency energy is received, the first and second planes comprising respective coordinates from the first axis and from a second axis and an angle of arrival of the radio frequency energy;
- means to convert the first and second planes to a directional vector relative to the vehicle, taking into account the orientation of the first and second linear arrays relative to the reference coordinate system and the orientation of the vehicle relative to the reference coordinate system;
- a processing means which receives the vertical and horizontal angles from the passive sensor and identifies the target in relation to the terrain and generates a directional signal for pointing the vehicle and vehicle systems towards the target; and
- an active sensor which is slewed toward the target in response to the directional signal, said active sensor emits a signal which rebounds off the target and returns to the active where a precise distance calculation is made and provided to the processing means, which in turn is transmitted to the pilot of the vehicle as well as the weapons system.

25. A target location system for a vehicle comprising:
- at least one linear array which receives radio frequency energy and is positioned on said vehicle at a known angle relative to a known inertial coordinate system;
- means connected to said at least one linear arrays to determine first and second planes in which the radio frequency energy is received, the first and second planes comprising respective coordinates from the first axis and from a second axis; and
- means to convert the first and second planes to a directional vector relative to the vehicle, taking into account the orientation of the at least one linear array relative to the known inertial coordinate system and the orientation of the vehicle relative to the known inertial coordinate system.

26. The system of claim 25 further comprising a laser range finder that provides a target elevation angle with respect to the coordinates of the vehicle within the known inertial coordinate system.

* * * * *